(12) United States Patent
Naito

(10) Patent No.: US 6,390,142 B1
(45) Date of Patent: May 21, 2002

(54) ENGINE EXHAUST SYSTEM

(75) Inventor: Takahiko Naito, Kawaguchi (JP)

(73) Assignee: Sankei Giken Kogyo Kabushiki Kaisya, Tokyo (JP)

( * ) Notice: Subject to any disclaimer, the term of this patent is extended or adjusted under 35 U.S.C. 154(b) by 0 days.

(21) Appl. No.: 09/957,077

(22) Filed: Sep. 21, 2001

(51) Int. Cl.[7] .................................................. F16L 9/00
(52) U.S. Cl. .................. 138/177; 138/177; 138/DIG. 11
(58) Field of Search ................................ 138/177, 178, 138/DIG. 11

(56) References Cited

U.S. PATENT DOCUMENTS 5,269,650 A  * 12/1993  Benson .................... 138/177 X
6,098,668 A  *  8/2000  Siwinski et al. ............ 138/177

* cited by examiner

Primary Examiner—Patrick Brinson
(74) Attorney, Agent, or Firm—Armstrong, Westerman & Hattori, LLP.

(57) ABSTRACT

This invention relates to an engine exhaust system for automobiles or the like; and more specifically, to an exhaust system having a crook of a generally U-shape at the mid section of the pipe line constituting the exhaust system. Even when a U-shaped crook is provided at the mid section of the pipe line constituting an exhaust system described above, the flowing resistance of exhaust air can be reduced to a minimum value to prevent the back pressure from being applied to the engine or lowering of the output of the engine. The engine exhaust system is such that the U-shaped crook forms a gentle curve so that the cross sectional area of the internal space of the U-shaped crook near the top portion is at least 1.3 times the minimum cross sectional area of the internal space of the pipe line having the U-shaped crook.

4 Claims, 4 Drawing Sheets

Fig. 1
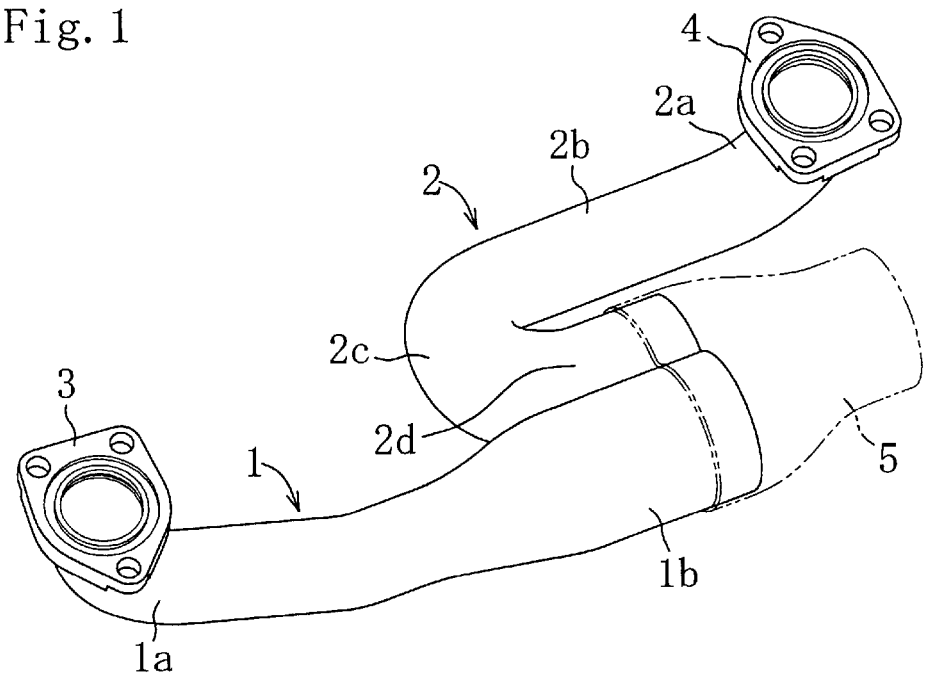
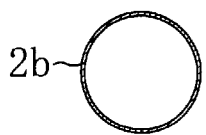
Fig. 2A
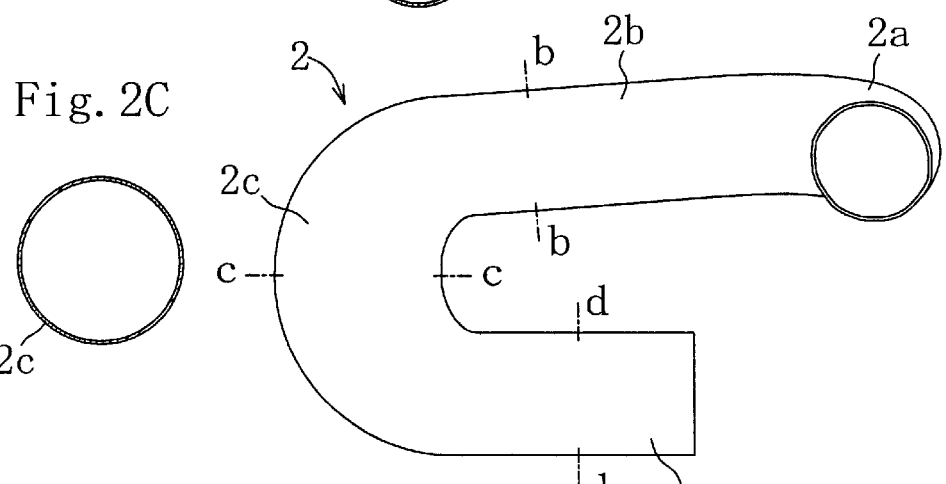
Fig. 2B
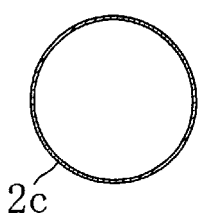
Fig. 2C
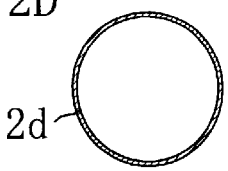
Fig. 2D

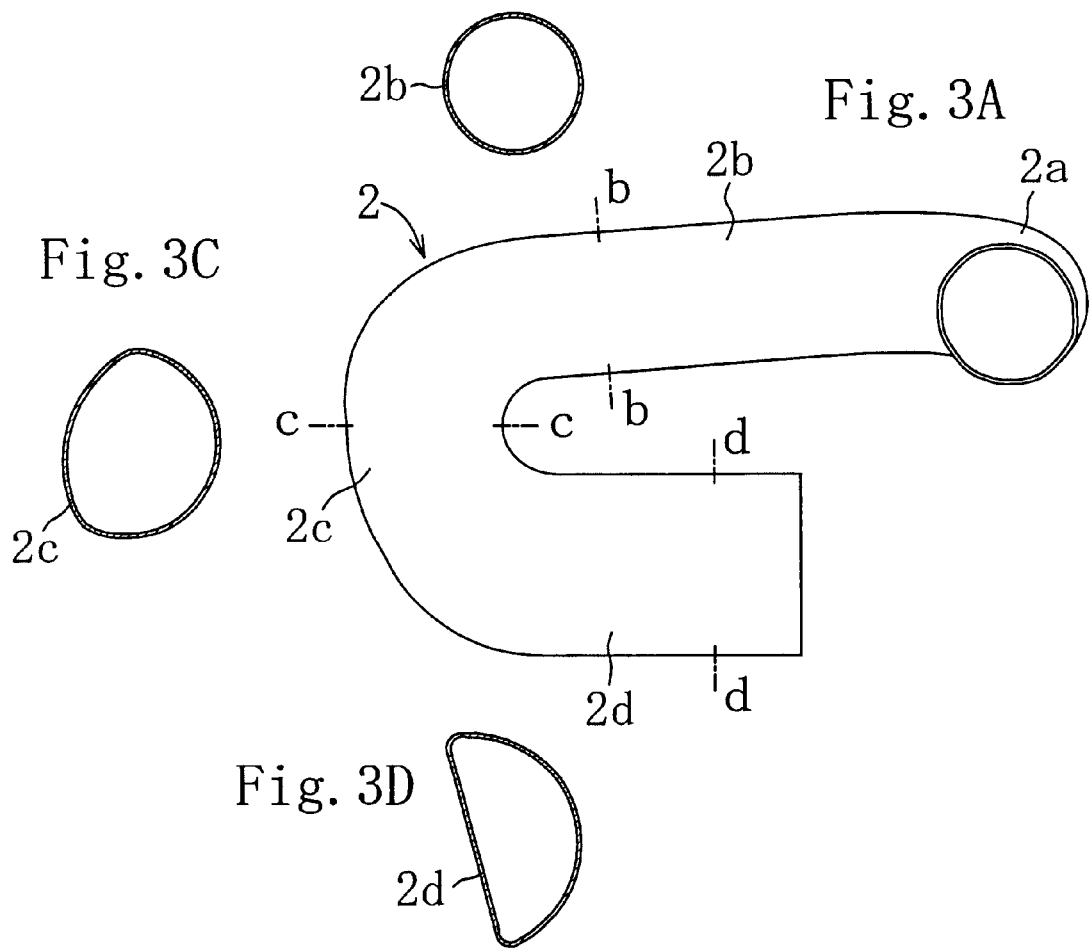

ENGINE EXHAUST SYSTEM

BACKGROUND OF THE INVENTION

1. Field of the Invention

The present invention relates to an engine exhaust system for automobiles or the like; and more specifically, to an exhaust system having a crook of generally U-shape at the mid section of the pipe line constituting the exhaust system.

2. Description of the Related Art

An engine exhaust system having a crook of approximately U-shape at the mid section of the pipe line constituting the exhaust system as described above is known. For example, when the exhaust pipe extending from the front cylinder of the transverse engine and the exhaust pipe extending from the rear cylinder are linked up at a downstream side of the engine, the exhaust pipe extending from the rear cylinder is curved toward the front below the engine, and then bent into a U-shape to link with the exhaust pipe extending from the front cylinder. Alternatively, there is a case where the exhaust-air flow pipe disposed in the muffler is bent into a U-shape in the muffler for retaining a sufficient length required for achieving a prescribed sound eliminating function.

The cross sectional area of the internal space of the U-shaped crook, including the pipe line in the vicinity thereof, is almost constant; and the pipe line is formed into a required minimum size considering the maximum feed rate of exhaust air and sound eliminating feature. Therefore, the flow of exhaust air is slow at the crook; and thus, resistance is generated and applied to the engine as a back pressure, which may disadvantageously result in lowering of engine performance or engine output.

As a conceivable measure to alleviate resistance at the crook, the cross sectional area of the internal space of the entire pipe line may be increased. However, since such a structure may often cause turbulence or vortex in exhaust air, resistance of flow cannot necessarily be reduced, and in addition, it may disadvantageously lower the sound eliminating capability and increase the cost and the weight.

SUMMARY OF THE INVENTION

With such circumstance in view, it is an object of the present invention to provide an engine exhaust system that can minimize flowing resistance of exhaust air even when there is a U-shaped crook at the mid section of the pipe line constituting the exhaust system.

In order to achieve the object described above, an engine exhaust system of the present invention has the following structure.

The engine exhaust system comprising a generally U-shaped crook at the mid section of the pipe line constituting the exhaust system according to the present invention is characterized in that the U-shaped crook forms a gentle curve so that the cross sectional area of the internal space of the U-shaped crook near the top portion is at least 1.3 times the minimum cross sectional area of the internal space of the pipe line having the U-shaped crook.

With such a simple structure that the U-shaped crook forms a gentle curve so that the cross sectional area of the internal space near the top portion of the generally U-shaped crook provided at the mid section of the pipe line constituting the exhaust system is at least 1.3 times the minimum cross sectional area of the internal space of the pipe line having the U-shaped crook, the flowing resistance can be reduced to the minimum value without generating turbulence or vortex in exhaust air in the crook, whereby the lowering of output of the engine due to the back pressure applied to the engine can conveniently be prevented. In addition, since the cross sectional area of the internal space of the generally straight pipe portion on both sides of the crook may be the minimum size, the cost of materials or the weight can be reduced in comparison with the case where the diameter of the entire crook including the straight pipe portion is large as in the related art; and thus, it can conveniently be arranged within a narrow space such as the bottom portion of the vehicle body or the muffler.

BRIEF DESCRIPTION OF THE DRAWINGS

FIG. 1 is a perspective view showing an embodiment of the engine exhaust system according to the present invention;

FIG. 2A is a plan view showing a part of the engine exhaust system in FIG. 1;

FIGS. 2B–2D are cross sectional views taken along the lines b—b, c—c, and d—d in FIG. 2A, respectively;

FIG. 3A is a plan view showing a part of a modified example of the engine exhaust system in FIG. 1;

FIGS. 3B–3D are cross sectional views taken along the lines b—b, c—c, and d—d in FIG. 3A, respectively;

DESCRIPTION OF THE PREFERRED EMBODIMENTS

Figure 4:
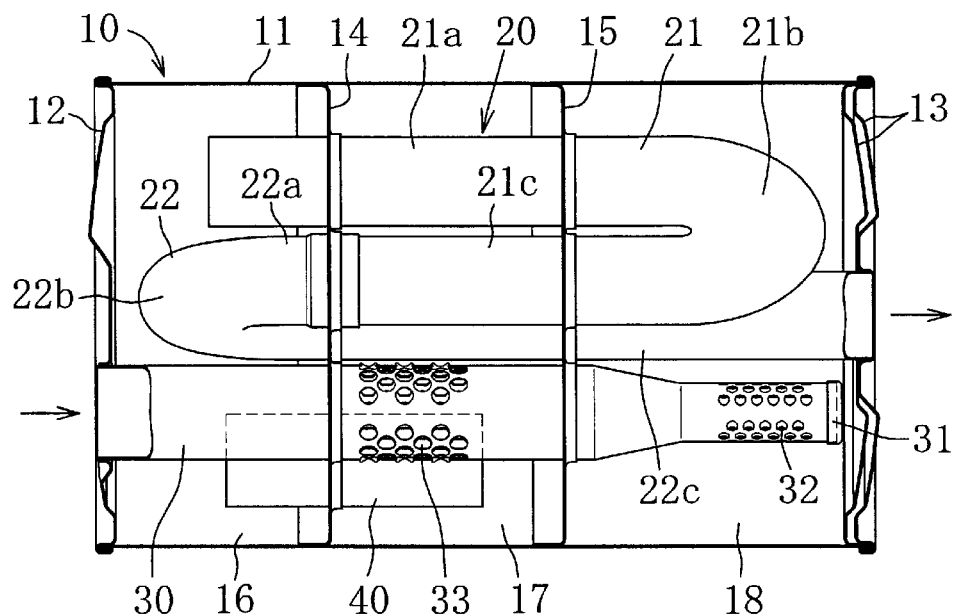
FIG. 4 is a cross sectional plan view of the engine exhaust system according to another embodiment of the present invention.

The present invention will be described in detail referring to embodiments shown in the figures.

Referring now to an embodiment shown in FIG. 1 and FIG. 2, the present invention is applied to a U-shaped crook formed on an exhaust pipe 2 extending from a rear cylinder of a transverse engine in order to link up an exhaust pipe 1 extending from a front cylinder and the exhaust pipe 2 extending from the rear cylinder below the engine. The exhaust pipes 1, 2 are connected to the exhaust manifold of the front cylinder and to that of the rear cylinder of the engine respectively via the flange couplings 3, 4 provided on each end 1a, 2a.

The exhaust pipe 2 extending from the rear cylinder is curved into U-shape toward the front at the portion located below the engine and then linked up with the rear end portion 1b of the exhaust pipe 1 extending from the front cylinder at the junction 5. Exhaust air merged at the junction 5 is continuously guided via a catalytic converter to the muffler located at the rear portion of the vehicle body, but it is not shown in the figure.

The U-shaped crook 2c and the straight pipe portions 2b and 2d of the exhaust pipe 2 are formed respectively generally into a circular shape in cross section as shown in FIGS. 2B–2D. The U-shaped crook 2c forms a gentle curve or a gradual curve so that the cross sectional area of the internal space of the U-shaped crook 2c near the top portion (in the figure, it is shown as a cross section taken along the line c—c in FIG. 2A) is at least 1.3 times the minimum cross sectional area of the internal space of the pipe line having the U-shaped crook. Especially, in this embodiment, the cross sectional area of the internal space of the straight pipe portion 2b located at an upstream side of the U-shaped crook 2c of the exhaust pipe 2 is the smallest, and the top portion of the crook 2c is at least 1.3 times the minimum cross sectional area of the internal space thereof.

In this structural arrangement, flowing resistance of exhaust air can be reduced to the minimum value without generating turbulence or vortex in exhaust air; and thus, lowering of the engine output due to the back pressure applied to the engine can be prevented.

In this embodiment, the cross sectional configuration of the U-shaped crook 2c and the straight pipe portions 2b, 2d on both thereof of the exhaust pipe 2 are formed generally into a circular shape, but they do not necessarily have to be circular. For example, they may be formed into different shapes as shown in FIG. 3C in order to prevent intervention with other parts that are to be disposed in the vicinity of the exhaust pipe 2. Alternatively, the straight pipe portion 2d downstream of the exhaust pipe 2 may be formed generally into a semi-circular shape in cross section as shown in FIG. 3D, and the downstream portion of the exhaust pipe 1 that is to be linked therewith into a symmetrical semi-circular shape in cross section to simplify the structure of the junction.

FIG. 4 and FIGS. 5A–5D show another embodiment of the present invention, in which the present invention is applied to the exhaust-air flow pipe disposed in the muffler in a state of being curved into a U-shape. The muffler is constructed in such a manner that the muffler body 10, defined by closing the opposite ends of the external tube 11 by the end plates 12, 13, is divided into two expansion chambers 16, 17 and one resonance chamber 18 by diaphragms 14, 15; and the exhaust-air flow pipe 20 having two U-shaped crooks 21b, 22b extends through those diaphragms 14, 15 so as to go and back through these three chambers 16–18.

The exhaust-air flow pipe 20 is formed, in this embodiment, of two pipe materials 21, 22; and these pipe materials 21, 22 are provided with U-shaped crooks 21b, 22b and straight pipe portions 21a, 21c and 22a, 22c in communication with these U-shaped crooks 21b, 22b, respectively. The straight pipe portion 21c of the pipe material 21 and the straight pipe portion 22a of the pipe material 22 are fitted with respect to each other at the portion passing through the diaphragm 14.

Figure 5A:
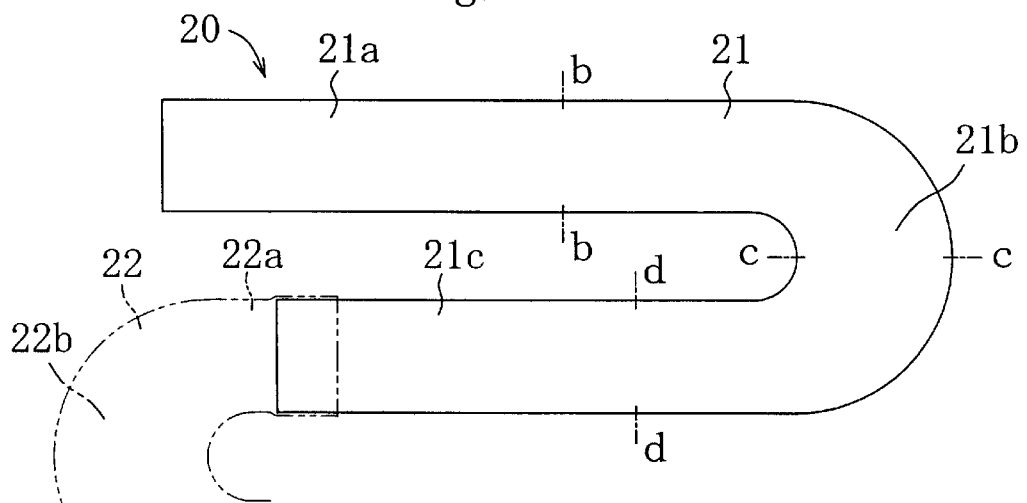
FIGS. 5A–5D are enlarged plan views showing a part of the engine exhaust system in FIG. 4.
Figure 5B:
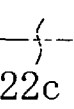
Figure 5C:
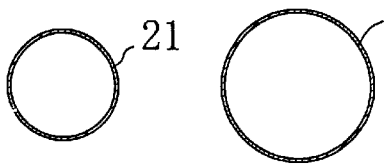
Figure 5D:
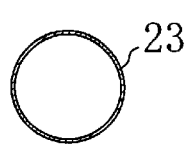

Each U-shaped crook 21b, 22b forms a gentle curve or a gradual curve so that the cross sectional area of the internal space at the top portion is at least 1.3 times the minimum cross sectional area of the internal space of the pipe line, or the exhaust-air flow pipe 20. More particularly, in the case shown in the figure, the cross sectional areas of the internal space of the straight pipe are approximately the same for the portions 21a, 21c, 22a, 22c; and the cross sectional areas of the internal space at the top portions of the crooks 21b, 22b are 1.3 times the cross sectional area of the internal space of the straight pipe at the portions 21a, 21c, 22a, 22c. Although only the straight pipe portions 21a, 21c and the U-shaped crook 21b of the pipe material 21 are shown in FIGS. 5B–5D, the straight pipe portions 22a, 22c and the crook 22b of the pipe material 22 are also constructed in the same manner.

In the figure, the reference material 30 designates an exhaust-air introduction pipe, and the downstream end thereof is closed by the end plate 31. The exhaust-air introduction pipe 30 and the resonance chamber 18 are brought into communication with each other by a through hole 32 formed in the vicinity of the end plate 31 so that the exhaust sound of a frequency determined by the opening area of the through hole 32 and the volume of the resonance chamber 18 is eliminated by resonance effect.

An exhaust-air introduction hole 33 is provided at the longitudinal center of the exhaust air introduction pipe 30 for introducing exhaust air introduced into the muffler body 10 through the introduction pipe 30 into the expansion chamber 17; and exhaust air introduced through the introduction hole 33 into the expansion chamber 17 is introduced through the communicating pipe 40 into the expansion chamber 16. After repeating expansion and contraction, exhaust air is introduced into the exhaust-air flow pipe 20.

Since the exhaust-air flow pipe 20 comprises the straight pipe portions 21a, 21c, 22a, 22c, and the U-shaped crooks 21b, 22b, and the crooks 21b, 22b forms gentle curves or gradual curves so that the cross sectional area of the internal space at the top portion is at least 1.3 times the minimum cross sectional area of the internal space in the pipe line, or the exhaust-air flow pipe 20, exhaust air can be flown smoothly and the back pressure applied to the engine, which may lower the output of the engine, may be conveniently prevented.

In the embodiment described above, the present invention is applied to the exhaust-air flow pipe 20 having two U-shaped crooks 21b, 22b. However, the number of crooks may vary, and the cross sectional configuration of the crooks or of the straight pipe portions may be changed as appropriate. While the exhaust-air flow pipe 20 is constructed of two pipe materials 21, 22 in the embodiment described above, it may also be applied to the structure having one pipe material, or more than two pipe materials.

EXAMPLE

In the exhaust system shown in FIG. 1 and FIG. 2, the flowing feature of exhaust air was inspected with the crook 2c formed in a gentle curve so that the cross sectional area of the internal space of the top portion of the U-shaped crook 2c was 1.3 times the minimum cross sectional area of the internal space of the exhaust system. The result was as described below.

Figure 6:
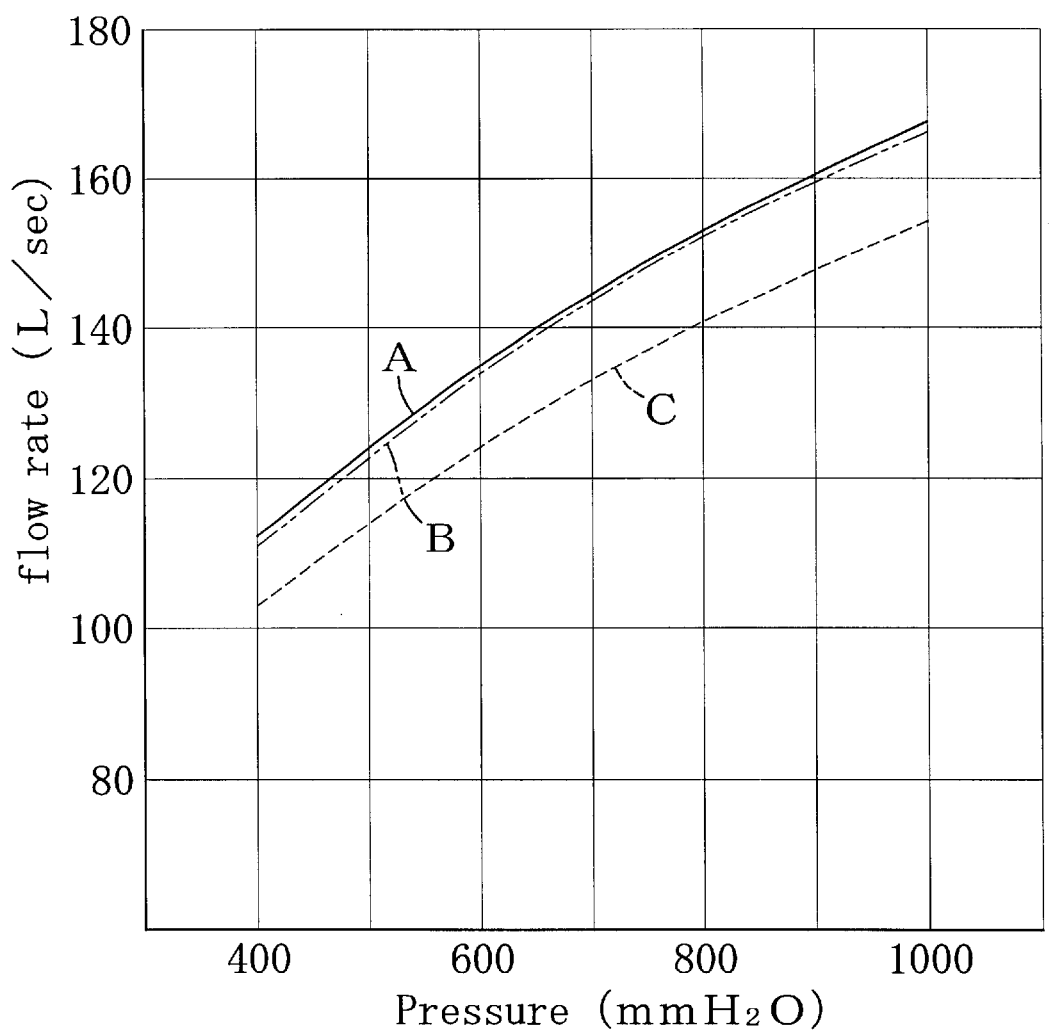
FIG. 6 is a graph showing the flowing resistance of exhaust air inspected by the use of the exhaust system according to the present invention.

FIG. 6 shows a relation between the supplied pressure and the flow rate when air was supplied to the exhaust system described above. The sign A designates the case of the embodiment according to the present invention; the sign B designates the case where a straight pipe having the same diameter as the embodiment described above but without U-shaped crook is used; and the sign C designates the case where the diameters of the U-shaped crook and the straight pipe portion are the same.

As is clear from FIG. 6, it was found that the exhaust system A according to the present invention in which the crook forms a gentle curve so that the cross sectional area of the internal space near the top portion of the U-shaped crook was 1.3 times the minimum cross sectional area of the internal space of the pipe line was smaller in flowing resistance of exhaust air in comparison with the exhaust system C in which the diameter of the U-shaped crook was the same as that of the straight pipe portion. Consequently, there was no possibility of lowering the output of the engine due to the back pressure applied to the engine. Although it is apparent that determining the cross sectional area of the internal space near the top portion of the U-shaped crook to be more than 1.3 times the minimum cross sectional area of the internal space of the pipe line helps to further reduce the flowing resistance, but when it is too large, the volume of the crook increases and thus takes up much space. Therefore, it is preferable to set it to an appropriate size.

What is claimed is:

1. An engine exhaust system comprising a generally U-shaped crook at the mid section of the pipe line constituting an exhaust system, wherein the U-shaped crook forms a gentle curve so that the cross sectional area of the internal space of the U-shaped crook near a top portion is at least 1.3 times the minimum cross sectional area of the internal space of the pipe line having the U-shaped crook.

2. An engine exhaust system comprising a generally U-shaped crook formed on an exhaust pipe extending from a rear cylinder of a transverse engine in order to link up an exhaust pipe extending from a front cylinder and the exhaust pipe extending from the rear cylinder below the engine, wherein the U-shaped crook forms a gentle curve so that the cross sectional area of the internal space near a top portion of the U-shaped crook is at least 1.3 times the minimum cross sectional area of the internal space of the exhaust pipe extending from the rear cylinder.

3. An engine exhaust system as set forth in claim 2, wherein the cross sectional configuration of the straight pipe portion downstream of the exhaust pipe extending from the rear cylinder is formed generally into a semi-circular shape in cross section.

4. An engine exhaust system comprising a generally U-shaped crook at the mid section of the exhaust-air flow pipe disposed in a muffler, wherein the U-shaped crook forms a gentle curve so that the cross sectional area of the internal space near a top portion of the U-shaped crook is at least 1.3 times the minimum cross sectional area of the internal space of the exhaust-air flow pipe.

* * * * *